(12) United States Patent
McBrearty

(10) Patent No.: US 10,831,409 B2
(45) Date of Patent: Nov. 10, 2020

(54) VOLUME RECONFIGURATION FOR VIRTUAL MACHINES

(71) Applicant: International Business Machines Corporation, Armonk, NY (US)

(72) Inventor: Gerald F. McBrearty, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 240 days.

(21) Appl. No.: 15/814,573

(22) Filed: Nov. 16, 2017

(65) Prior Publication Data

US 2019/0146719 A1 May 16, 2019

(51) Int. Cl.
| G06F 3/06 | (2006.01) |
| G06F 9/50 | (2006.01) |
| G06F 9/455 | (2018.01) |

(52) U.S. Cl.
CPC .......... *G06F 3/0664* (2013.01); *G06F 3/0665* (2013.01); *G06F 9/45558* (2013.01); *G06F 9/5077* (2013.01); *G06F 3/0607* (2013.01); *G06F 9/45533* (2013.01); *G06F 2009/45579* (2013.01)

(58) Field of Classification Search
CPC ........ G06F 9/50; G06F 9/5005; G06F 9/5016; G06F 9/5022; G06F 9/5044; G06F 9/5055; G06F 9/5061; G06F 9/5066; G06F 9/5072; G06F 9/5077; G06F 9/52; G06F 9/5011; G06F 9/505; G06F 9/5083; G06F 9/5088; H04L 29/08153; H04L 29/08171; H04L 29/818; H04L 29/08189; H04L 29/08243; H04L 29/08261; H04L 29/0827; H04L 29/08279
See application file for complete search history.

(56) References Cited

U.S. PATENT DOCUMENTS

| 6,343,324 | B1 * | 1/2002 | Hubis ................... G06F 3/0622 709/229 |
| 8,713,182 | B2 | 4/2014 | Agneeswaran |
| 9,135,031 | B1 | 9/2015 | Knight |
| 9,411,620 | B2 | 8/2016 | Wang et al. |
| 9,420,004 | B2 | 8/2016 | Palshikar et al. |

(Continued)

OTHER PUBLICATIONS

Coles et al., "Cells: a Self-hosting Virtual Infrastructure Service," 2012 IEEE/ACM Fifth International Conference on Utility and Cloud Computing (UCC), Nov. 2012, pp. 57-64. DOI: 10.1109/UCC.2012.17.

(Continued)

*Primary Examiner* — Yaima Rigol
(74) *Attorney, Agent, or Firm* — James L. Olsen (57) ABSTRACT

Aspects of the present disclosure concern automated volume reconfiguration for volumes assigned to a virtual machine (VM). Properties of a volume controller with respect to a set of input/output (I/O nodes) used to transmit a set of volumes to the VM are analyzed, wherein each volume of the set of volumes is mapped to an I/O node of the set of I/O nodes. Based on the analysis, a reconfiguration action is determined, wherein the reconfiguration action includes migrating at least one volume of the set of volumes to a different I/O node of the set of I/O nodes. The reconfiguration action is then executed.

3 Claims, 6 Drawing Sheets

(56) References Cited

U.S. PATENT DOCUMENTS

| | | | |
|---|---|---|---|
| 9,477,407 B1 | 10/2016 | Marshak et al. | |
| 9,477,508 B1 | 10/2016 | Vemuri | |
| 9,501,245 B2* | 11/2016 | Hussain | G06F 3/0664 |
| 9,575,781 B1 | 2/2017 | Suit | |
| 9,594,770 B1 | 3/2017 | Kushmerick et al. | |
| 9,626,222 B2 | 4/2017 | Puttaswamy Naga | |
| 9,900,265 B2* | 2/2018 | Leather | H04L 49/101 |
| 2006/0190698 A1* | 8/2006 | Mizuno | H04L 67/1097 |
| | | | 711/170 |
| 2008/0244196 A1* | 10/2008 | Shitomi | G06F 3/0605 |
| | | | 711/147 |
| 2009/0025007 A1* | 1/2009 | Hara | G06F 3/0607 |
| | | | 718/105 |
| 2009/0287898 A1* | 11/2009 | Hara | G06F 3/0607 |
| | | | 711/170 |
| 2010/0313043 A1* | 12/2010 | Tsukada | G06F 3/0625 |
| | | | 713/320 |
| 2011/0283279 A1 | 11/2011 | Graves | |
| 2012/0072687 A1* | 3/2012 | Hiraiwa | G06F 3/0619 |
| | | | 711/162 |
| 2012/0079226 A1* | 3/2012 | Kihara | G06F 3/0665 |
| | | | 711/165 |
| 2012/0290630 A1 | 11/2012 | Aizman et al. | |
| 2013/0204960 A1* | 8/2013 | Ashok | G06F 15/17 |
| | | | 709/213 |
| 2014/0208045 A1* | 7/2014 | Warszawski | G06F 3/0619 |
| | | | 711/159 |
| 2016/0004444 A1* | 1/2016 | Nakajima | G06F 3/0605 |
| | | | 711/154 |
| 2017/0109045 A1* | 4/2017 | Crawford | G06F 3/0604 |
| 2019/0108157 A1* | 4/2019 | Nakagawa | G06F 3/0635 |
| 2019/0268262 A1* | 8/2019 | Wang | H04L 49/70 |

OTHER PUBLICATIONS

He et al., Developing Resource Consolidation Frameworks for Moldable Virtual Machines in Clouds, Future Generation Computer Systems, 2014, vol. 32, pp. 69-81. http://wrap.warwick.ac.uk/54735.

Xu et al., "Identifying State Inconsistency in OpenStack," SOSR '15: Proceedings of the 1st SIGCOMM Symposium on Software Defined Networking Research, Article No. 11, Jun. 2015, pp. 1-10.

Hogan, C., "Storage DRS Affinity & Anti-Affinity Rules," VMware vSphere Blog, Sep. 26, 2011, pp. 1-5. https://blogs.vmware.com/vsphere/2011/09/storage-drs-affinity-anti-affinity-rules.html.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

VOLUME RECONFIGURATION FOR VIRTUAL MACHINES

BACKGROUND

The present disclosure relates generally to the field of cloud computing, and in particular to volume management in a distributed computing system.

The amount of data that needs to be organized by enterprises is increasing. Accordingly, management of a shared pool of configurable computing resources can be desired to increase performance efficiency. For example, storage area networks (SAN's) can be used to provide access to block level data storage over a network. These systems can ensure that computing nodes in a distributed computing environment receive the memory required to store the ever-increasing amount of data associated with the computing nodes. SAN's enhance computing nodes such that memory provided over the network appears to the operating system (OS) to be locally attached memory (e.g., hard drives).

SUMMARY

Embodiments of the present disclosure include a method, computer program product, and system for automated volume reconfiguration for volumes assigned to a virtual machine (VM). Properties of a volume controller with respect to a set of input/output (I/O nodes) used to transmit a set of volumes to the VM are analyzed, wherein each volume of the set of volumes is mapped to an I/O node of the set of I/O nodes. Based on the analysis, a reconfiguration action is determined, wherein the reconfiguration action includes migrating at least one volume of the set of volumes to a different I/O node of the set of I/O nodes. The reconfiguration action is then executed.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cloud computing, and in particular to volume management in distributed computing systems. While the present disclosure is not necessarily limited to such applications, various aspects of the disclosure may be appreciated through a discussion of various examples using this context.

In a virtualized computing environment, there can be complex elements for the creation of virtual machines (VM's) and the assignment of backing storage (e.g., block storage) thereto. In some situations, a volume scheduler can be configured to manage volume pools (e.g., storage pools) assigned to the VM's. In these situations, the volumes can be assigned based on VM requirements and/or hardware specifications. A volume driver can then execute the commands as issued by the scheduler.

As volume management is currently completed, schedulers only manage volumes on an individual basis. Schedulers are not configured to schedule groups of volumes simultaneously. Accordingly, for customized volume management, extra specification types can be defined and assigned to the volume driver (e.g., via a deployment template) in order to customize the criteria to be used when assigning back-end storage. This allows a deployer (e.g., VM manager or virtualization layer) to request specific attributes for the volumes on a back-end controller (e.g., hardware that manages the allocation of the volumes). However, defining extra specification types requires manual intervention, and additionally requires careful consideration of specific requirements for the VM's and characteristics of the back-end storage, which adds additional operation costs to the system.

To efficiently manage extra specifications, orchestrators can be used to guide the pairing of volumes to VM's. However, the burden of keeping track of the characteristics of VM's and back-end hardware then resides with the orchestrator. Accordingly, orchestrators must be designed to understand the constructs of back-ends, in addition to the requirements for each VM instance. These complexities hinder the commercial viability of orchestration systems.

Aspects of the present disclosure enable automatic reconfiguration of a set of volumes assigned to a VM within a set of input/output (I/O) nodes of a volume controller (e.g., back-end controller). During initial assignment, each volume assigned to the VM is routed through a specific I/O node. The properties of the volume controller with respect to the set of I/O nodes and the VM are analyzed. Based on the analysis, a reconfiguration action is determined, which includes migrating at least one volume of the set of volumes to a different I/O node of the set of I/O nodes. The reconfiguration action can include grouping volumes together on common I/O nodes (herein referred to as "grouping"). The reconfiguration can also include anti-grouping volumes on separate I/O nodes (e.g., herein referred to as "anti-grouping"). In some embodiments, grouping includes determining a number of host entries associated with each I/O node, and migrating all volumes assigned to the VM to the I/O node with the least host entries. In some embodiments, anti-grouping includes determining the I/O nodes least utilized by the VM, and migrating the volumes to the least utilized I/O nodes.

The aforementioned design allows automatic reconfiguration of volumes currently assigned to VM's without requiring management of a deployment template. Based on the properties and current workload of the volume controller, the volumes assigned to a given VM can be automatically reconfigured. This can increase the performance of the system. For example, grouping volumes to a common I/O node reduces excessive bandwidth, reduces fibre channel zoning, and increases storage utilization on the volume controller. Further, anti-grouping increases availability of volumes to the VM. For example, by spreading the volumes across several I/O nodes, the impact any given I/O node that goes offline has on the system can be decreased.

Figure 1:
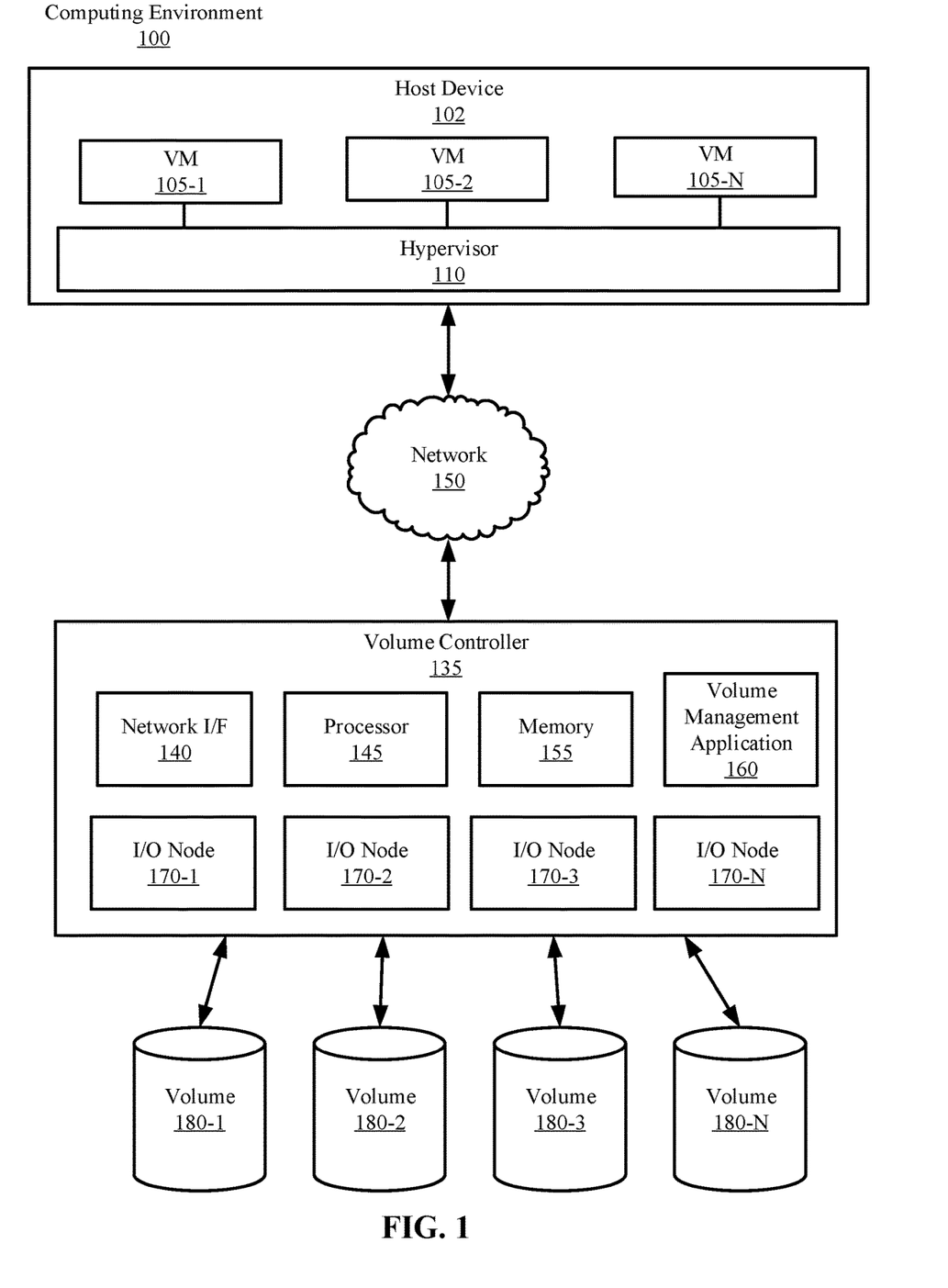
FIG. 1 is a block diagram illustrating an example computing environment including a volume controller communicatively coupled to a host device, in accordance with embodiments of the present disclosure.

Referring now to the figures, FIG. 1 is a block diagram illustrating an example computing environment 100 for volume management, in accordance with embodiments of the present disclosure. The computing environment 100 includes a volume controller 135 communicatively coupled to volumes 180-1, 180-2, 180-3 . . . 180-N (herein collectively referred to as volumes 180). The volume controller 135 is communicatively coupled to a host device 102 including a hypervisor 110 via a network 150. The hypervisor 110 includes a plurality of virtual machines (VM's), VM 105-1, VM 105-2 . . . VM 105-N (herein collectively referred to as VM's 105).

Consistent with various embodiments, the volume controller 135 and host device 102 are computer systems. The volume controller 135 includes a network I/F 140, processor 145, and memory 155. The host device 102 also includes a corresponding network I/F, processor, and memory (not shown). The host device 102 and the volume controller 135 are configured to communicate with each other through internal or external network interfaces (e.g., network interface 140). The network interfaces are, in some embodiments, modems or network interface cards. The volume controller 135 and/or host device 102 can be equipped with a display or monitor. Additionally, the volume controller 135 and host device can include optional input devices (e.g., a keyboard, mouse, scanner, video camera, or other input device), and/or any commercially available or custom software (e.g., browser software, communications software, server software, natural language processing software, search engine and/or web crawling software, filter modules for filtering content based upon predefined parameters, etc.). The volume controller 135 and host device 102 can be servers, desktops, laptops, or hand-held devices.

The host device 102 and the volume controller 135 can be distant from each other and communicate over a network 150. In some embodiments, the volume controller 135 is a central hub from which one or more devices (not shown) can establish a communication connection, such as in a client-server networking model. Alternatively, the volume controller 135 and host device 102 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the host device 102 and the volume controller 135 can be local to each other, and communicate via any appropriate local communication medium. For example, the host device 102 and the volume controller 135 can communicate using a local area network (LAN), one or more hardwire connections, a wireless link or router, or an intranet. In some embodiments, the host device 102 and the volume controller 135 are communicatively coupled using a combination of one or more networks and/or one or more local connections. For example, the host device 102 can be hardwired to the volume controller 135 (e.g., connected with an Ethernet cable) while a second host device (not shown) can communicate with the volume controller 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The volume controller 135 includes input/output (I/O) nodes. The I/O nodes include I/O node 170-1, I/O node 170-2, I/O node 170-3 . . . I/O node 170-N (herein collectively referred to as I/O nodes 170). The I/O nodes 170 are mapped to specific volumes 180, and enable the allocation of volumes 180 to the VM's 105. The I/O nodes 170 can include one or more fibre channels, which can be coupled with optical fiber cables to quickly and reliably transfer large volumes of data over the network 150.

The volume controller 135 includes a volume management application 160, which can be configured to automatically reconfigure (e.g., group and anti-group) volumes 180 within the I/O nodes 170 with respect to the VM's 105. That is, the volume management application 160 can route specific volumes 180 assigned to the VM's 105 through specific I/O nodes 170.

In some embodiments, the volume management application 160 is configured to group volumes 180 assigned to VM's 105. For example, if volumes 180-1 and 180-2 are assigned to VM 105-1, and volume 180-1 is routed through I/O node 170-1, and volume 180-2 is routed through I/O node 170-2, the volume management application 160 can be configured to migrate volume 180-2 through I/O node 170-1 instead of I/O node 170-2. This example illustrates volume grouping.

By grouping volumes 180 to I/O nodes 170, the storage utilization for the volume controller 135 can be maximized. For example, in certain circumstances, the number of host entries (e.g., virtual machine assignments) can be limited on the volume controller 135. As an example, the limit number of host entries mapped to a given volume controller (e.g., volume controller 135) can be 2,000 host entries. In this example, if there are four I/O nodes (e.g., with equal data transfer capabilities), the number of host entries per I/O node is 500. If a single VM (e.g., VM 105-1) receives four volumes as routed through all four I/O nodes, one host entry is generated for each I/O node, and accordingly, the single VM occupies 4/2000 host entries. On the other hand, if the VM receives the four volumes through a single I/O node, only 1/2000 host entries are occupied. Accordingly, greater storage utilization can be achieved by grouping volumes 180 to specific nodes 170.

Further, grouping volumes 180 assigned to VM's 105 to I/O nodes 170 can reduce the number of logic paths required to receive the assigned volumes 180. Following the example above, if a single VM routes through four I/O nodes, the number of networking paths (e.g., fibre channels, optical cables, etc.) followed to receive the corresponding volumes increases based on the hardware configuration (e.g., which may be four times the number of paths on the back-end). This can occupy excessive bandwidth, and accordingly, impede data transfer efficiency. For example, fibre channel zoning can increase depending on the number of I/O nodes 170 the VM's 105 access the volumes 180 through. Grouping the assigned volumes 180 into corresponding I/O nodes 170 can reduce the data traffic through the fibre channel zones, and increase data transfer efficiency while reducing excessive bandwidth consumption.

The volume management application 160 can group volumes 180 in any manner. In some embodiments, the number of host entries associated with each I/O node 170 are determined, and all volumes 180 are automatically migrated to the I/O node with the fewest host entries. Grouping can also consider specific transfer speed rates and/or hardware requirements associated with specific I/O nodes 170. For example, if a volume 180-1 requires coupling with 110 node 170-1 (e.g., based on hardware parameters), then volume 180-1 can be flagged (e.g., tagged or indicated) to require I/O node 170-1, preventing it from being migrated to another I/O node. In this example, all other volumes assigned to the VM can be migrated to node 170-1. Conversely, all other volumes can be assigned to a different I/O node (e.g., I/O node 170-2), while maintaining the association between volume 180-1 and node 170-1.

In some embodiments, grouping volumes 180 assigned to VM's 105 to specific I/O nodes 170 can consider the I/O node(s) most utilized by the VM. In these embodiments, the volumes 180 can be migrated to the I/O node most utilized by the VM. This can reduce the total number of volume migrations for a given VM.

Any number of volumes 180 can be grouped to any number of I/O nodes. Though specific reference is made to grouping volumes 180 to a single I/O node, in some embodiments, grouping may include pairing groups of volumes 180 to groups of I/O nodes 170. For example, 100 volumes can be mapped to two I/O nodes (e.g., with 50 volumes routed through each of the two I/O nodes). Any configuration of volume/node pairing can be executed, and may depend on specific hardware parameters or VM requirements.

In some embodiments, the volume management application 160 can be configured to anti-group volumes 180 assigned to VM's across the I/O nodes 170. For example, if volumes 180-1-180-3 are all routed through I/O node 170-1, they can be anti-grouped to spread the volumes across I/O nodes 170-1-170-3. Anti-grouping, though more resource intensive, can increase availability of volumes 180 to the VM's 105. For example, if all the volumes 180 are grouped to a single I/O node, and the I/O node experiences high traffic or is taken offline for any reason, all of the volumes become inaccessible to the VM. On the other hand, if the volumes 180 are spread across the I/O nodes 170 and only a single I/O node experiences a bottleneck (e.g., experiences high traffic, made inaccessible, taken offline, etc.), other volumes not paired to the single I/O node are still accessible. Accordingly, spreading the volumes 180 across the I/O nodes 170 can increase availability of the volumes 180 to the VM's 105.

Anti-grouping volumes 180 connected to VM's 105 can be completed in any manner. In some embodiments, the I/O nodes 170 utilized the least by the VM's 105 are determined, and the volumes 180 are migrated to the I/O nodes utilized least by the VM's 105. This method can ensure that volumes are redirected through I/O nodes 170 in a balanced manner, such that each I/O node receives a similar number of volumes. In some embodiments, anti-grouping volumes 180 can involve a predetermined selection of I/O nodes 170. For example, if all volumes 180 are routed through I/O 170-1, and anti-grouping is specified to only migrate volumes 180 through I/O node 170-2 (as opposed to I/O nodes 170-3-170-N), then the volumes 180 can be anti-grouped to I/O node 170-2. Anti-grouping volumes 180 can occur in any manner, with any proportion of volumes 180 routed through specific I/O nodes 170 (e.g., a 3:2:1 anti-grouping ratio for I/O nodes 170-1, 170-2 and 170-3, respectively).

In some embodiments, anti-grouping volumes 180 can take into consideration specific hardware requirements for volumes 180 with respect to the I/O nodes 170. This can ensure, in situations where volumes 180 require specific I/O nodes 170, that hardware incompatibility or performance impeding migrations do not occur.

While FIG. 1 illustrates a computing environment 100 with a single volume controller 135 and host device 102, suitable computing environments for implementing embodiments of this disclosure can include any number of controllers or host devices. The various models, modules, systems, and components illustrated in FIG. 1 can exist, if at all, across a plurality of controllers and devices. For example, some embodiments can include two volume controllers. The two volume controllers can be communicatively coupled using any suitable communications connection (e.g., using a WAN, a LAN, a wired connection, an intranet, or the Internet).

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

Further, though reference in FIG. 1 is made to reconfiguration of volumes with respect to I/O nodes, reconfiguration can be applied to any back-end controller property. For example, in embodiments in which each I/O node includes a plurality of fibre channel ports, specific fibre channel ports can be selected for reconfiguration. In these examples, grouping can include pairing volumes to the same fibre channel port, and anti-grouping can include splitting volumes off of the same fibre channel port and migrating the volumes across a plurality of fibre channel ports.

Figure 2:
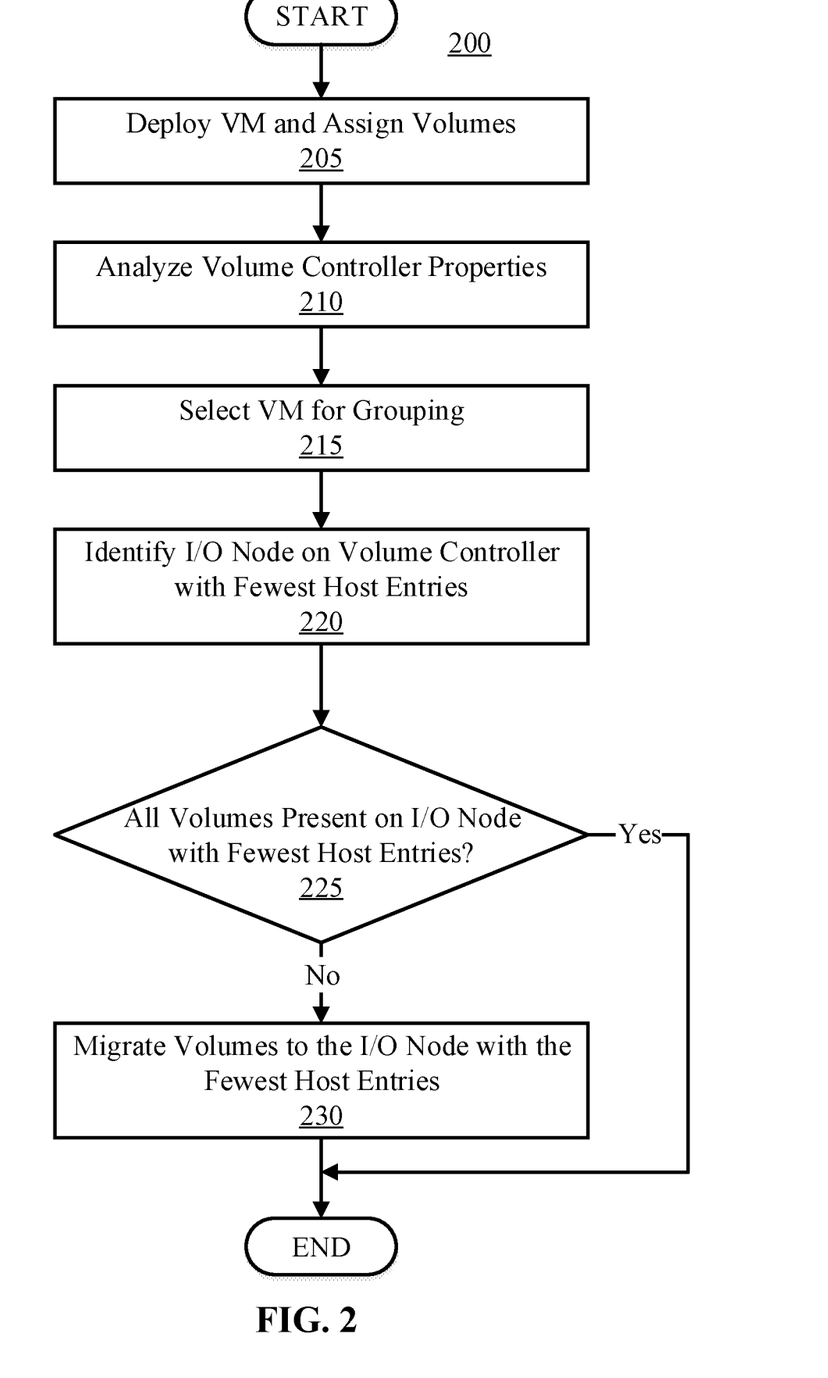
FIG. 2 is a flow diagram illustrating an example method to group volumes assigned to a VM to an I/O node, in accordance with embodiments of the present disclosure.

FIG. 2 is a flow diagram illustrating a process 200 for grouping volumes assigned to VM to an I/O node, in accordance with embodiments of the present disclosure. With respect to FIG. 2, the I/O nodes, volume controller, VM's, and volumes described can be the same as or substantially similar to the I/O nodes 170, volume controller 135, VM's 105, and volumes 180 referenced in FIG. 1

Process 200 beings at step 205, where VM's are initially deployed with volumes being assigned thereto. The VM's can be deployed via one or more hypervisors. The hypervisor(s) are associated with bare metal hardware, and can allocate portions of the hardware to specific VM's, such that the VM's operate as individual computer systems. VM's can each include a guest operating system (OS), virtual hardware, and one or more applications.

Volumes can be initially assigned in any manner. In some embodiments, volumes are assigned to VM's via a volume driver, which receives volume requests from a volume scheduler to allocate volumes to specific VM's. In some embodiments, volumes can be initially assigned via a volume orchestrator, which can deploy volumes in accordance with a deployment template. The deployment template can include extra storage specifications to route specific volumes to specific VM's. In some embodiments, the deployment template can specify I/O node pairings with volumes. The deployment template can be constructed based on VM requirements and/or hardware parameters (e.g., the backend volume controller and volume characteristics). However, in some embodiments, volumes can be manually assigned to VM's.

After VM's are deployed and volumes are assigned to the VM's, properties of the volume controller which facilitate the volume assignment are analyzed. This is illustrated at step 210. Analyzing the volume controller properties can include analyzing hardware properties of the volume controller (e.g., memory, processing power, etc.) and determining limitations of the volume controller (e.g., the total number of host entries for each node, the number of networking paths for each I/O node, the data transfer capability of each I/O node, etc.) Further, analyzation at step 210 can include determining current workload characteristics associated with the volume controller. For example, determining current workload characteristics can include analyzing the total number of VM's associated with the volume controller, the total number of volumes associated with the volume controller, the total number of host entries on the volume controller, the total number of I/O nodes on the volume controller, the total number of volumes routed through each I/O node on the volume controller, and the total number of host entries for each VM associated with the volume controller. Analysis can be completed automatically (e.g., via an application which extracts volume controller hardware parameters and current workload characteristics) or manually (e.g., via a user analysis through a graphical user interface (GUI)).

After the volume controller properties are analyzed at step 210, process 200 proceeds to step 215, where a VM is selected for grouping. The VM selected for grouping can be based on the analysis completed at step 210. For example, if a VM receives volumes that are spread across a plurality of I/O nodes as indicated by the analysis of the volume controller properties, the VM can be selected for grouping. In some embodiments, VM's can be selected for grouping based on a threshold (e.g., the number of I/O nodes associated with a VM exceeds a predetermined threshold). In some embodiments, if all volumes assigned to a VM are not routed through the same I/O node, the VM is automatically selected for grouping. However, selecting a VM for volume grouping can be completed in any other manner otherwise consistent herein. For example, in some embodiments each VM associated with the volume controller is automatically selected for grouping.

After a VM is selected for grouping, the I/O node on the volume controller with the fewest host entries is identified. This is illustrated at operation 215. The I/O node with the fewest host entries can be determined based on the analysis completed at operation 210. Selecting the I/O node with the fewest host entries for volume grouping can ensure a balanced workload on each I/O node, without overburdening any single I/O node. However, an I/O node or group of I/O nodes can be selected for grouping based on any other criteria. For example, to minimize the number of volume migrations, in some embodiments the I/O node the VM is utilizing most can be selected for volume migration. In some embodiments, groups of I/O nodes can be selected for volume grouping. This can be beneficial if there are not enough available host entries to migrate volumes to any single I/O node. Further, hardware requirements or predefined rules (e.g., policies) can be considered when grouping volumes. For example, if a given volume is tied to an I/O node based on hardware requirements, that volume may remain associated with its corresponding I/O node regardless of the volume grouping policy.

At step 225, a determination is made whether all volumes assigned to the selected VM are present on the node with the fewest host entries. If all volumes assigned to the selected VM are present on the node with the fewest host entries, then process 200 ends, as the preferred volume grouping is already accomplished. If all volumes assigned to the selected VM are not present on the node with the fewest host entries, then process 200 proceeds to step 230, where the volumes are migrated to the I/O node with the fewest host entries. Migrating the volumes associated with a VM to the I/O node with the fewest host entries can include rerouting the deployment of the volumes to the VM through the selected I/O node. This can reduce the total number of host entries on the volume controller, and accordingly increase storage utilization. Further, the number of logical paths taken to receive the volumes can be minimized, as all of the volumes are routed through a single communication path.

Process 200 illustrates an example method of grouping volumes based on an I/O node with the fewest host entries, however, grouping can be completed in any other manner. For example, in some embodiments, grouping can consider the I/O node most utilized by the VM (e.g., to minimize migration actions), groups of I/O nodes sought for grouping (e.g., to group to a set of I/O nodes), hardware requirements (e.g., volumes tied to specific I/O nodes), the I/O node with the most host entries (e.g., to avoid grouping on overburdened I/O nodes), etc. Further, though FIG. 2 illustrates steps for a volume grouping process, the steps can be completed in any order (or simultaneously), and are not limited to those described. For example, in some embodiments, step 215 is completed prior to step 210. As an example, a specific VM can first be selected for grouping. Afterwards, analyzation of properties of the volume controller only relevant to that VM can be analyzed.

Further, though reference in FIG. 2 is made to reconfiguration of volumes with respect to I/O nodes, reconfiguration can be applied to any back-end controller property. For example, in embodiments in which each I/O node includes a plurality of fibre channel ports, specific fibre channel ports can be selected for reconfiguration. In these examples, grouping can include pairing volumes to the same fibre channel port.

Figure 3:
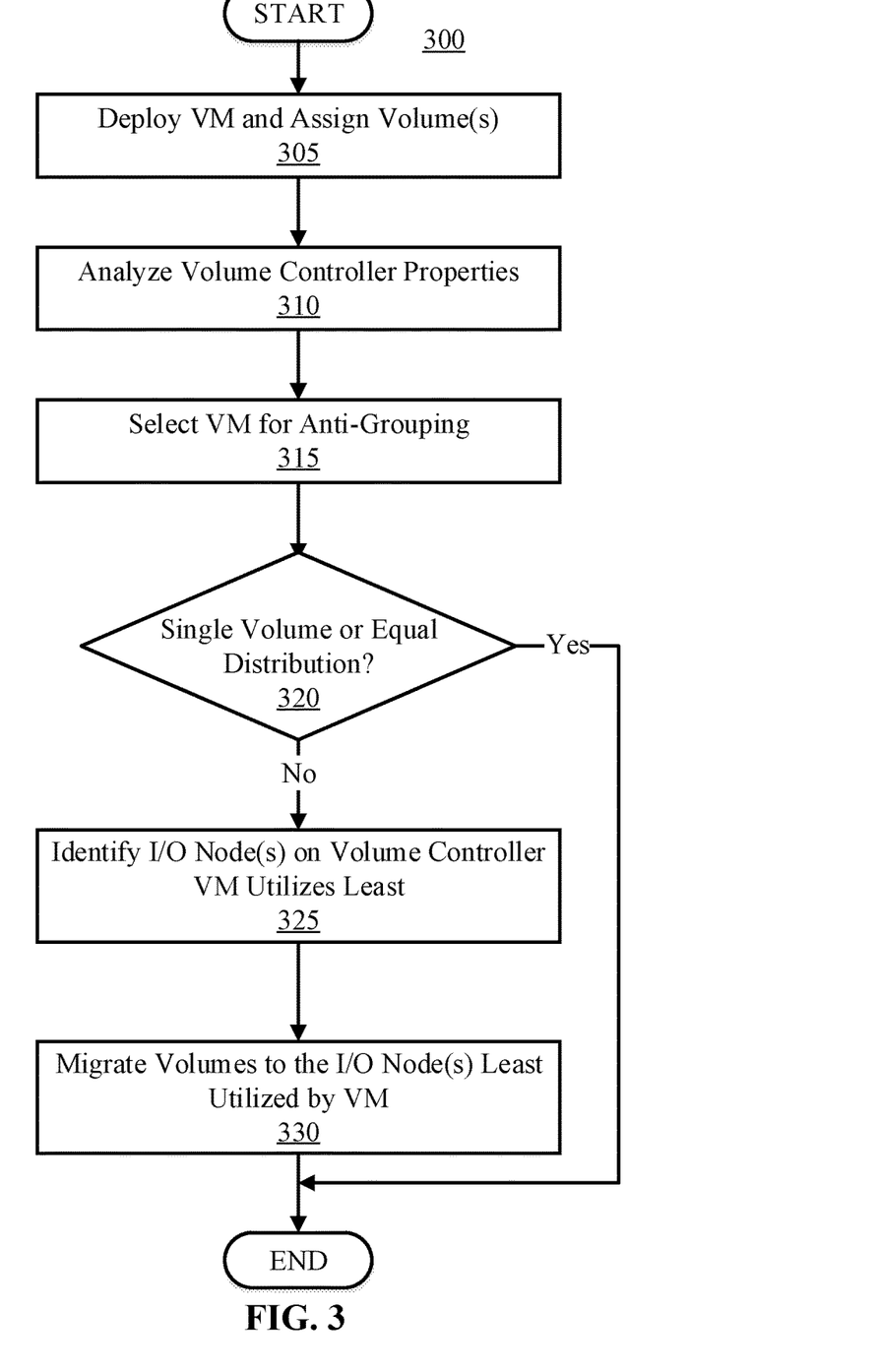
FIG. 3 is a flow diagram illustrating an example method to anti-group volumes assigned to a VM across a plurality of I/O nodes, in accordance with embodiments of the present disclosure.

FIG. 3 is a flow diagram illustrating an example process 300 for anti-grouping volumes assigned to a VM across a plurality of I/O nodes, in accordance with embodiments of the present disclosure. With respect to FIG. 3, the I/O nodes, volume controller, VM's, and volumes described can be the same as or substantially similar to the I/O nodes 170, volume controller 135, VM's 105, and volumes 180 referenced in FIG. 1

Process 300 beings at step 305, where VM's are initially deployed with volumes being assigned thereto. The VM's can be deployed via one or more hypervisors. The hypervisor(s) are associated with bare metal hardware, and can allocate portions of the hardware to specific VM's, such that the VM's operate as individual computer systems. VM's can each include a guest operating system (OS), virtual hardware, and one or more applications.

Volumes can be initially assigned in any manner. In some embodiments, volumes are assigned to VM's via a volume driver, which receives volume requests from a volume scheduler to allocate volumes to specific VM's. In some embodiments, volumes can be initially assigned via a volume orchestrator, which can deploy volumes in accordance with a deployment template. The deployment template can include extra storage specifications to route specific volumes to specific VM's. In some embodiments, the deployment template can specify I/O node pairings with volumes. The deployment template can be constructed based on VM requirements and/or hardware parameters (e.g., the backend volume controller and volume characteristics). However, in some embodiments, volumes can be manually assigned to VM's.

After VM's are deployed and volumes are assigned to the VM's, properties of the volume controller which facilitate the volume assignment are analyzed. This is illustrated at step 310. Analyzing the volume controller properties can include analyzing hardware properties of the volume controller (e.g., memory, processing power, etc.) and identifying limitations of the volume controller (e.g., the total number of host entries for each node, the number of networking paths for each I/O node, the data transfer capability of each I/O node, etc.) Further, analyzation at step 310 can include determining current workload characteristics associated with the volume controller. For example, determining current workload characteristics can include analyzing the total number of VM's associated with the volume controller, the total number of volumes associated with the volume controller, the total number of host entries on the volume controller, the total number of I/O nodes on the volume controller, the total number of volumes routed through each I/O node on the volume controller, and the total number of host entries for each VM associated with the volume controller. Analysis can be completed automatically (e.g., via an application which extracts volume controller hardware parameters and current workload characteristics) or manually (e.g., via a user analysis through a graphical user interface (GUI)).

After the volume controller properties are analyzed at step 310, process 300 proceeds to step 315, where a VM is selected for anti-grouping. The VM selected for anti-grouping can be based on the analysis completed at step 310. For example, if a VM receives volumes that are all routed through a single I/O node as indicated by the analysis of the volume controller properties, the VM can be selected for anti-grouping. In some embodiments, VM's can be selected for anti-grouping based on a threshold (e.g., the number of volumes on a given I/O node associated with a VM exceeds a predetermined threshold). In some embodiments, if all volumes assigned to a VM are not equally spread across different I/O nodes, the VM is automatically selected for anti-grouping. However, selecting a VM for volume anti-grouping can be completed in any other manner otherwise consistent herein. For example, in some embodiments each VM associated with the volume controller is automatically selected for anti-grouping. In some embodiments, selection for anti-grouping at step 315 can consider the importance of a VM (e.g., to prioritize availability of volumes to important VM's).

At step 320, a determination is made whether a single volume or equal volume distribution (e.g., across I/O nodes) is assigned to the VM selected for anti-grouping. If a single volume is assigned to the VM, anti-grouping is not necessary. Further, if all volumes assigned to the selected VM are already equally distributed across I/O nodes, anti-grouping is also not necessary (e.g., though reconfiguration may still be completed based on another policy). In some embodiments, selection of the VM at step 315 can consider these factors (e.g., single volume or equal volume distribution), and automatically exclude VM's which are not suitable for anti-grouping. In these embodiments, a determination may not be necessary at step 320, as the VM selected for anti-grouping can automatically be determined to not be associated with a single volume or equal volume distribution. If a determination is made that a single volume or equal volume distribution across I/O nodes is assigned to the VM, process 300 ends, as the suitable anti-grouping configuration is already accomplished or otherwise not possible. If a determination is made that a single volume or equal volume distribution across I/O nodes is not assigned to the VM, then process 300 proceeds to step 325, where the I/O node(s) on the volume controller least utilized by the VM are identified.

Identifying I/O node(s) least utilized at step 325 can include determining the total number of volume to I/O node pairing, and identifying the I/O nodes which have the least volume pairings. In some embodiments, the I/O nodes which require volume migrations to accomplish an equal distribution of the volumes across the I/O nodes are identified as the least utilized I/O nodes. For example, if a VM utilizes 100 volumes through four I/O nodes, and the current volume distribution is: I/O node A—60 volumes, I/O node B—10 volumes, I/O node C—15, and I/O node D—15 volumes, then I/O nodes B-D can be identified as the I/O nodes least utilized by the VM. After the I/O nodes least utilized by the VM are identified, process 300 proceeds to step 330, where volumes are migrated to the I/O node(s) least utilized by the VM.

Based on the identified I/O nodes, a reconfiguration action (e.g., anti-grouping) is executed. This is illustrated at step 330. Following the example above, volumes associated with I/O node A can be migrated to I/O nodes B-D (e.g., the least utilized I/O nodes). In this example, 15 volumes are migrated to I/O node 2, 10 volumes are migrated to I/O node 3, and 10 volumes are migrated to I/O node 4. This migration yields an equal volume distribution of 25 volumes across the four I/O nodes. In some embodiments, volumes are automatically migrated from the I/O node with the highest volume to the I/O node with the lowest volume until an equal distribution is obtained.

Process 300 illustrates an example method of anti-grouping volumes based the I/O node(s) least utilized by the VM, however, anti-grouping can be completed in any other manner. For example, in some embodiments, anti-grouping can consider the I/O nodes with the fewest host entries (e.g., to prioritize anti-grouping to readily available nodes), groups of I/O nodes sought for anti-grouping (e.g., to anti-group to specific sets of I/O nodes), hardware requirements (e.g., volumes tied to specific I/O nodes), the I/O node with the most host entries (e.g., to avoid migrating to overburdened I/O nodes), etc. Further, though FIG. 3 illustrates steps for a volume grouping process, the steps can be completed in any order (or simultaneously), and are not limited to those described. For example, in some embodiments, step 315 is completed prior to step 310. As an example, a specific VM can first be selected for anti-grouping. Afterwards, analyzation of properties of the volume controller only relevant to that VM can be analyzed.

Further, though reference in FIG. 3 is made to reconfiguration of volumes with respect to I/O nodes, reconfiguration can be applied to any back-end controller property. For example, in embodiments in which each I/O node includes a plurality of fibre channel ports, specific fibre channel ports can be selected for reconfiguration. In these examples, anti-grouping can include splitting volumes off of the same fibre channel port and migrating the volumes across a plurality of fibre channel ports.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
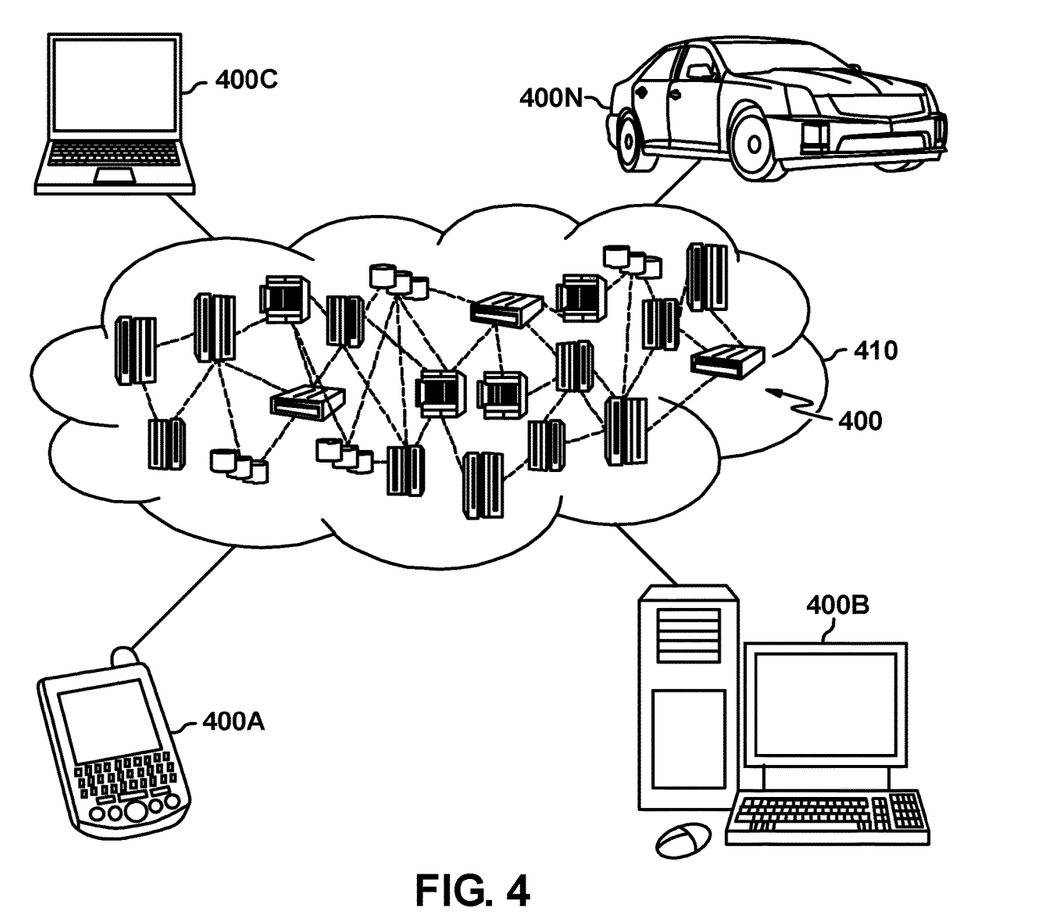
FIG. 4 is a diagram illustrating a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B (e.g., host device 102 and volume controller 135) laptop computer 400C (e.g., host device 102 and volume controller 135), and/or automobile computer system 400N can communicate. Nodes 400 can communicate with one another. They can be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
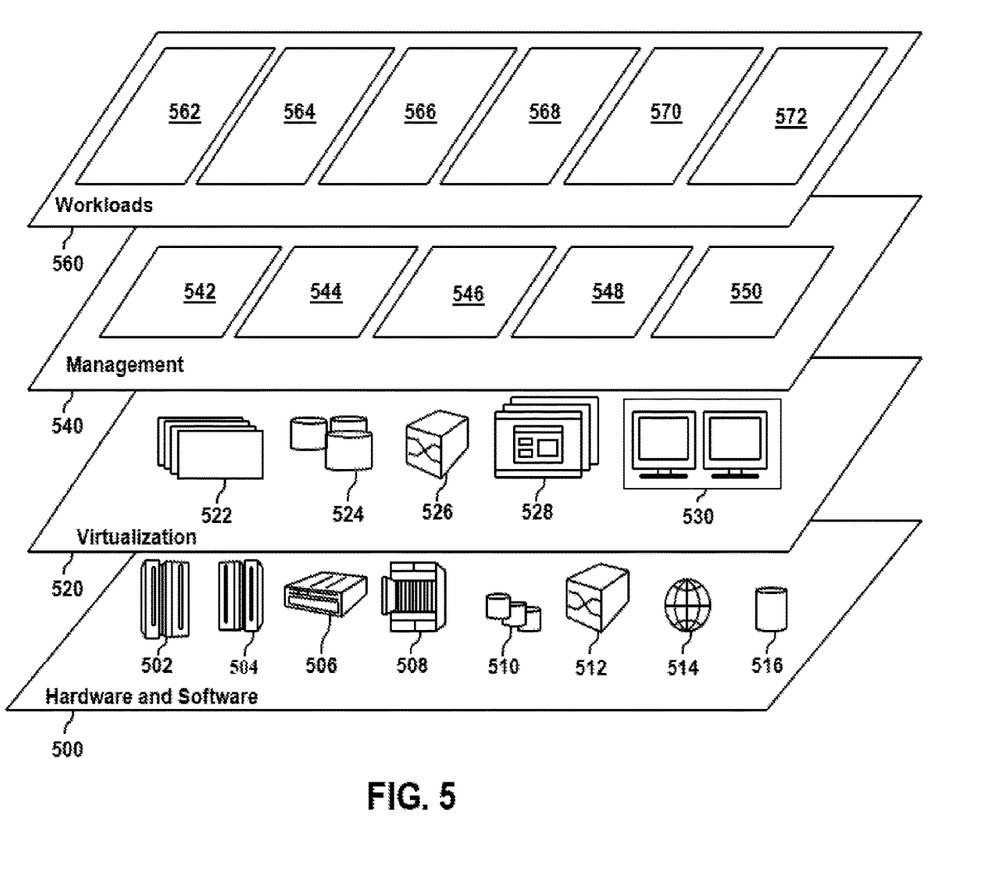
FIG. 5 is a block diagram illustrating abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities can be provided: virtual servers 522; virtual storage 524; virtual networks 526, including virtual private networks; virtual applications and operating systems 528; and virtual clients 530.

In one example, management layer 540 can provide the functions described below. Resource provisioning 542 provides dynamic procurement of computing resources and other resources that are utilized to perform tasks within the cloud computing environment. For example, resource provisioning 542 can allocate additional computing resources to devices (e.g., devices 102 of FIG. 1) which are indicated to have high activity. Metering and Pricing 544 provide cost tracking as resources are utilized within the cloud computing environment, and billing or invoicing for consumption of these resources. In one example, these resources can include application software licenses. In some embodiments, Metering and Pricing 544 indicates the number of allotted licenses to machines (e.g., host device 102 and volume controller 135) in the system. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. For example, service level management 548 can indicate volume (e.g., volumes 180 of FIG. 1) requirements for specific VM's (e.g., VM's 105 of FIG. 1) Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment can be utilized. Examples of workloads and functions which can be provided from this layer include: mapping and navigation 562; software development and lifecycle management 564; virtual classroom education delivery 566; data analytics processing 568; transaction processing 570; and identifying an identifiable media 572.

Figure 6:
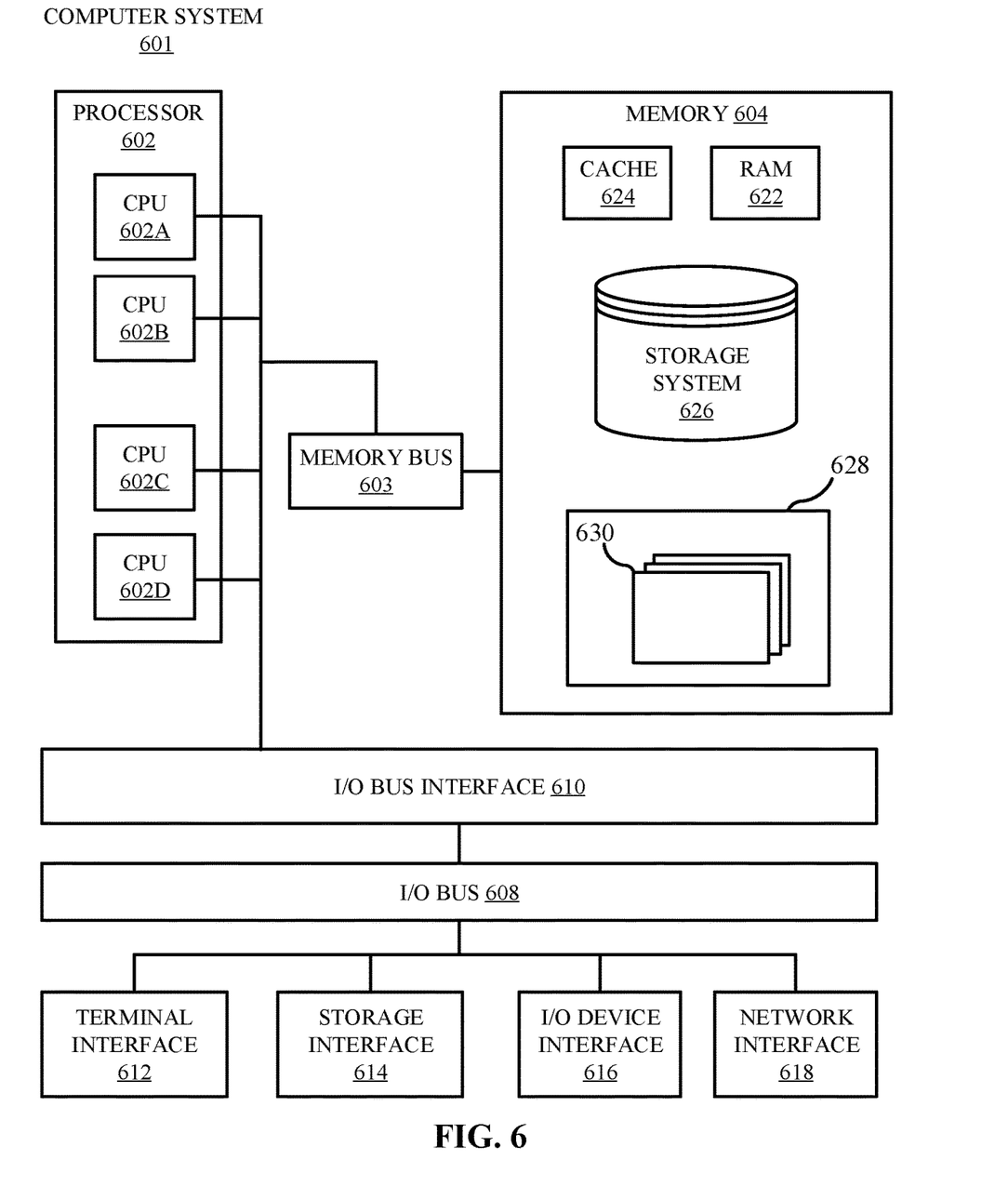
FIG. 6 is a high-level block diagram illustrating an example computer system that can be used in implementing one or more of the methods, tools, and modules, and any related functions, described herein, in accordance with embodiments of the present disclosure.

Referring now to FIG. 6, shown is a high-level block diagram of an example computer system 601 (e.g., host device 102 and volume controller 135) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 601 can comprise one or more CPUs 602, a memory subsystem 604, a terminal interface 612, a storage interface 614, an I/O (Input/Output) device interface 616, and a network interface 618, all of which can be communicatively coupled, directly or indirectly, for inter-component communication via a memory bus 603, an I/O bus 608, and an I/O bus interface unit 610.

The computer system 601 can contain one or more general-purpose programmable central processing units (CPUs) 602A, 602B, 602C, and 602D, herein generically referred to as the CPU 602. In some embodiments, the computer system 601 can contain multiple processors typical of a relatively large system; however, in other embodiments the computer system 601 can alternatively be a single CPU system. Each CPU 602 can execute instructions stored in the memory subsystem 604 and can include one or more levels of on-board cache.

System memory 604 can include computer system readable media in the form of volatile memory, such as random access memory (RAM) 622 or cache memory 624. Computer system 601 can further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 can include at least one program product having a set (e.g., at least one) of program modules that are configured to carry out the functions of various embodiments.

One or more programs/utilities 628, each having at least one set of program modules 630 can be stored in memory 604. The programs/utilities 628 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 628 and/or program modules 630 generally perform the functions or methodologies of various embodiments.

In some embodiments, the program modules 630 of the computer system 601 can include a volume management module. The volume management module can include computer instructions to analyze properties of a volume controller and determine potential reconfiguration actions (e.g., grouping or anti-grouping reconfiguration actions). The volume management module can also include computer instructions to execute the determined reconfiguration actions.

Although the memory bus 603 is shown in FIG. 6 as a single bus structure providing a direct communication path among the CPUs 602, the memory subsystem 604, and the I/O bus interface 610, the memory bus 603 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 can, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices can be connected directly to one or more system I/O buses.

In some embodiments, the computer system 601 can be a multi-user mainframe computer system, a single-user system, or a server computer or similar device that has little or no direct user interface, but receives requests from other computer systems (clients). Further, in some embodiments, the computer system 601 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components can have greater or lesser complexity than as represented in FIG. 6, components other than or in addition to those shown in FIG. 6 can be present, and the number, type, and configuration of such components can vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    analyzing properties of a volume controller having a set of fibre channel ports configured to transmit a set of volumes to a plurality of virtual machines, wherein each volume of the set of volumes is mapped to a fibre channel port of the set of fibre channel ports;
    determining whether all volumes assigned to a first virtual machine are routed through a first fibre channel port of the set of fibre channel ports;
    selecting, in response to determining that all volumes assigned to the first virtual machine are not routed through the first fibre channel port of the set of fibre channel ports, the virtual machine for grouping; and
    routing, in response to selecting the first virtual machine for grouping, all volumes assigned to the first virtual machine through the first fibre channel port.

2. A computer program product comprising a computer readable storage medium having program instructions embodied therewith, the program instructions executable by a processor to cause the processor to perform a method comprising:
    analyzing properties of a volume controller having a set of fibre channel ports used to transmit a set of volumes to a plurality of virtual machines, wherein each volume of the set of volumes is mapped to a fibre channel port of the set of fibre channel ports;
    determining whether all volumes assigned to a first virtual machine are routed through a first fibre channel port of the set of fibre channel ports;
    selecting, in response to determining that all volumes assigned to the first virtual machine are routed through the first fibre channel port of the set of fibre channel ports, the first virtual machine for anti-grouping; and
    executing, in response to selecting the first virtual machine for anti-grouping, a reconfiguration action such that all volumes assigned to the first virtual machine are equally routed through the set of fibre channel ports.

3. The computer program product of claim 2, wherein selecting the first virtual machine for anti-grouping further considers a determination that the first virtual machine is high priority compared to other virtual machines of the plurality of virtual machines.

* * * * *